Patented July 15, 1924.

1,501,348

UNITED STATES PATENT OFFICE.

ASA WILLARD JOYCE, OF NEWARK, NEW JERSEY.

DISAZO COLORING MATTER.

No Drawing.  Application filed June 7, 1923. Serial No. 644,055.

*To all whom it may concern:*

Be it known that I, ASA WILLARD JOYCE, a citizen of the United States, residing at Newark, in the county of Essex and State of New Jersey, have invented certain new and useful Improvements in Disazo Coloring Matters, of which the following is a full, clear, and exact description, such as will enable others skilled in the art to which it appertains to make and use the same.

This invention relates to the production of disazo dyes, and has as an object the production of such new coloring matters in a practical and economical manner.

Another object of the invention is the production of disazo coloring matters which shall be suitable for the accomplishment of dyeings upon wood and silk.

A further object of the invention is the production of disazo coloring matters which shall have marked fastness to light, washing, milling and bleaching.

Other objects of the invention will in part be obvious and will in part appear hereinafter.

I have found that by combining the tetrazo derivative of a substituted 4.4′ diamino benzophenon having the general formula:

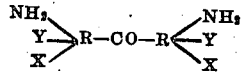

wherein X indicates an alkyl group, a halogen atom and a carboxyl group, Y a hydrogen atom and an alkyl group, and R the benzene residue, with one molecule of a napthol and one molecule of a napthol sulphonic acid of the general formula:

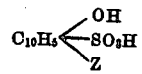

wherein Z indicates hydrogen and a sulphonic acid group, disazo dyes may be produced which vary in shade from bright yellowish red to bluish red. These coloring matters, from an acid bath, dye wool and silk, have marked fastness to light, washing, milling and bleaching, and conform to the general formula:

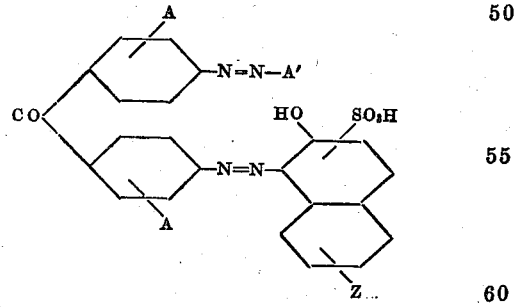

wherein A signifies an alkyl group, a halogen atom and a carboxyl group, A′ a napthol, and Z a hydrogen atom and a sulphonic acid group.

The substituted 4.4′ diamino benzophenon which is utilized in the preparation of the coloring matters is obtainable from the correspondingly substituted diamino diphenyl methane, according to the process described in United States Patent No. 1,220,248, which process consists in heating the corresponding substituted diamino diphenyl methane under a reflux for an extended period of time with a mixture of crystallized sodium sulfide and sulphur.

The substituted 4.4′ diamino benzophenon obtained in accordance with the foregoing procedure is dissolved in water containing hydrochloric acid and diazotized under the usual conditions by adding sodium nitrite thereto. To the diazotized solution in the cold there is added an aqueous solution of a napthol sulphonic acid with which is subsequently admixed under conditions of continued stirring and cooling with a solution of sodium carbonate until the reaction is weakly alkaline. This reaction mixture is added to a cold alkaline aqueous solution of a napthol, and the reaction mixture is stirred to complete formation of the coloring matter, whereupon the coloring matter is worked up in the usual manner.

The coloring matters in the dry state are dark brownish red powders, soluble in water, with the formation of a bright red solution. The aqueous solution upon the addition of caustic soda becomes darker and duller in shade, but remains unaltered upon the addition of either ammonia, sodium carbonate solution, or acids. In concentrated sulphuric acid the coloring matters dissolve with the formation of a solution having a deep reddish blue color. From an acid bath wool and silk are dyed bright red shades which are fast to light, washing, milling and bleaching. Upon reduction by means of tin and hydrochloric acid, the coloring matters give a substituted diamino benzophenon, an amino napthol and an amino napthol sulphonic acid.

The invention accordingly comprises the compositions of matter possessing the characteristics, properties and the relation of components which will be exemplified in the compositions hereinafter described and the scope of the application of which will be indicated in the claims.

The following examples present illustrative embodiments of a manner in accordance with which my invention may be carried into practical effect. The parts are by weight.

*Example 1.*—24 parts of 4.4' diamino 3.3' dimethyl benzophenon are tetrazotized by the addition of sodium nitrite to its solution containing hydrochloric acid in the usual manner. To the tetrazotized solution is added in the cold an aqueous solution containing 35 parts of the sodium salt of 2 naphthol 3.6 disulphonic acid (R-salt). This mixture is then admixed under conditions of continuous stirring and cooling with a solution of sodium carbonate until the mixture shows a weakly alkaline reaction. The stirring is continued for some time in order that the reaction may go to completion, whereupon the reaction mixture is added to a cold aqueous solution containing 15 parts of beta-naphthol and 15 parts of caustic soda lye (40° Bé.) and the whole stirred until the coloring matter is entirely formed. The coloring matter is then precipitated and separated according to the usual procedure. In the dry state it is a dark reddish brown powder. Wool and silk are dyed by it from an acid bath bright scarlet shades having marked fastness to light, washing, milling and bleaching.

*Example 2.*—The procedure herein is that described under Example 1, only that 35 parts of 2 naphthol 6.8 disulphonic acid (G-salt) are utilized, instead of 35 parts of 2 naphthol 3.6 disulphonic acid (R-salt), which substitution gives a coloring matter having the same general properties as that above described, but upon dyeing wool and silk from an acid bath the shades are a yellowish scarlet.

Among the substituted 4.4' diamino benzophenons which may be used, it is desired to mention specifically the following:

4.4' diamino 3.3' dimethyl benzophenon,
4.4' diamino 3.3' dichlor benzophenon,
4.4' diamino 3.3' dibrom benzophenon,
4.4' diamino 3.3' 6.6' tetramethyl benzophenon,
4.4' diamino 3.3' 5.5' tetramethyl benzophenon,
4.4' diamino 2.2' 3.3' tetramethyl benzophenon,
4.4' diamino benzophenon 3.3' dicarboxylic acid.

As a naphthol sulphonic acid, use may be made of either a naphthol mono-sulphonic acid or of a naphthol disulphonic acid. Naphthol monosulphonic acids, which may be utilized, are:

1 naphthol 4 sulphonic acid,
1    "    5    "         "
2    "    1    "         "
2    "    6    "         "
2    "    7    "         "
2    "    8    "         "

—etc., and of the naphthol disulphonic acids, there may be utilized:

2 naphthol 3.6 disulphonic acid,
2    "     6.8        "        "
1    "     3.6        "        "
1    "     3.8        "        "
1    "     4.8        "        "

—etc.
Either alpha or beta naphthol is applicable.

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. As new coloring matters, the disazo compounds obtained by combining one molecule of a substituted 4.4' diamino benzophenon having the general formula:

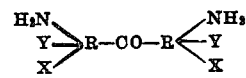

wherein X signifies an alklyl group, a halogen atom and a carboxyl group, Y a hydrogen atom and an alkyl group, and R the benzene residue, with one molecule of a naphthol and one molecule of a naphthol sulphonic acid of the general formula—

wherein Z signifies hydrogen and a sulphonic acid group.

2. As new coloring matters, the disazo compounds obtained by combining one molecule of a substituted 4.4' diamino benzophenon having the general formula:

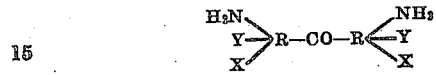

wherein X signifies an alkyl group, a halogen atom and a carboxyl group, Y a hydrogen atom and an alkyl group, and R the benzene residue, with one molecule of beta-naphthol and one molecule of a naphthol sulphonic acid of the general formula—

wherein Z signifies hydrogen and a sulphonic acid group.

3. As new coloring matters, the disazo compounds obtained by combining one molecule of a substituted 4.4' diamino benzophenon having the general formula—

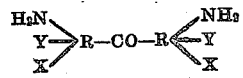

wherein X signifies an alkyl group, a halogen atom and a carboxyl group, Y a hydrogen atom and an alkyl group, and R the benzene residue, with one molecule of a naphthol and one molecule of a naphthol disulphonic acid.

4. As new coloring matters, the disazo compounds obtained by combining one molecule of 4.4' diamino 3.3' dimethyl benzophenon with one molecule of beta-naphthol and one molecule of a naphthol disulphonic acid.

5. A new coloring matter obtained by combining one molecule of 4.4' diamino 3.3' dimethyl benzophenon with one molecule of beta-naphthol and one molecule of 2 naphthol 3.6 disulphonic acid, which coloring matter in the form of a dry powder is of a dark brownish red color, is soluble in water and in concentrated sulphuric acid, and dyes wool and silk from an acid bath bright scarlet shades fast to light, washing, milling and bleaching.

6. Coloring matters having the following constitution:

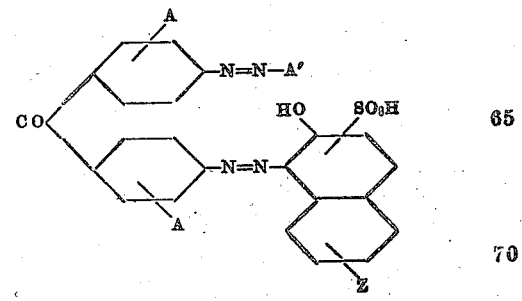

A signifying an alkyl group, a halogen atom and a carboxyl group, A' a naphthol, and Z a hydrogen atom and a sulphonic acid group.

7. A coloring matter having the constitution:

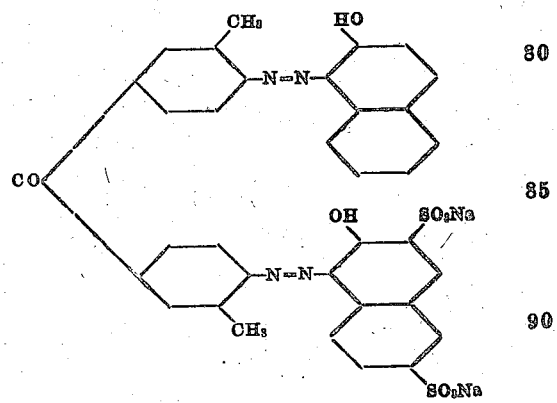

In testimony whereof I affix my signature, in the presence of two witnesses.

A. WILLARD JOYCE.

Witnesses:
 A. C. KARL,
 I. H. PULLER.